(12) United States Patent
Kapadia

(10) Patent No.: US 9,363,234 B2
(45) Date of Patent: *Jun. 7, 2016

(54) FAST UPDATE FILTER

(71) Applicant: JUNIPER NETWORKS, INC., Sunnyvale, CA (US)

(72) Inventor: Shamit Kapadia, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 799 days.

This patent is subject to a terminal disclaimer.

(21) Appl. No.: 13/724,720

(22) Filed: Dec. 21, 2012

(65) Prior Publication Data

US 2013/0117837 A1 May 9, 2013

Related U.S. Application Data

(63) Continuation of application No. 12/194,968, filed on Aug. 20, 2008, now Pat. No. 8,352,391.

(51) Int. Cl.
*H04L 29/06* (2006.01)
*G06N 5/02* (2006.01)

(52) U.S. Cl.
CPC ............ *H04L 63/0263* (2013.01); *G06N 5/025* (2013.01)

(58) Field of Classification Search
CPC . H04L 63/0227; H04L 63/0263; G06N 5/025
See application file for complete search history.

(56) References Cited

U.S. PATENT DOCUMENTS

| | | | |
|---|---|---|---|
| 5,946,679 A | 8/1999 | Ahuja et al. | |
| 6,816,455 B2 | 11/2004 | Goldberg et al. | |
| 7,093,288 B1 * | 8/2006 | Hydrie | H04L 63/0263 709/227 |
| 7,133,400 B1 | 11/2006 | Henderson et al. | |
| 7,760,730 B2 | 7/2010 | Goldschmidt et al. | |
| 7,769,873 B1 * | 8/2010 | Mackie | H04L 45/00 709/229 |
| 8,065,721 B1 * | 11/2011 | Shah | H04L 63/0209 726/13 |
| 2007/0039044 A1 * | 2/2007 | Moonen | H04L 63/0227 726/13 |
| 2007/0271363 A1 | 11/2007 | Ross et al. | |
| 2008/0022385 A1 * | 1/2008 | Crowell | H04L 63/0263 726/11 |
| 2008/0235755 A1 * | 9/2008 | Blaisdell | H04L 63/102 726/1 |
| 2009/0119661 A1 * | 5/2009 | Bernoth | G06F 8/67 717/176 |
| 2010/0037287 A1 * | 2/2010 | Netrakanti | H04L 45/04 726/1 |

OTHER PUBLICATIONS

Co-pending U.S. Appl. No. 12/194,968, filed Aug. 20, 2008 entitled "Fast Update Filter" by Shamit Kapadia et al., 33 pages.
(Continued)

*Primary Examiner* — Paul H Masur
(74) *Attorney, Agent, or Firm* — Harrity & Harrity, LLP

(57) ABSTRACT

A method may include defining a filter for a network device, the filter including a rule and a particular number of prioritized fields, where at least one of the prioritized fields is formatted to accept input as a range of values. The method may also include receiving a rule modification for the filter, the rule modification including at least one input as a range of values, and performing a check for conflicts of the rule modification with the rule in the filter. The method may further include expanding the input range of values to form multiple rules equivalent to the rule modification with the input range of values, establishing backtracking links to integrate the multiple rules with the existing rule, and adding the multiple rules to the filter.

20 Claims, 8 Drawing Sheets

(56) References Cited

OTHER PUBLICATIONS

Jinmei et al., 2003, "A Method of Processing Inbound IP Packets with a Routing Table," Electronics and Communications in Japan (Part 1: Communications), 86: 1-8, doi: 10.1002/ecja.10110.

Gupta et al., Mar./Apr. 2001, "Algorithms for Packet Classification," Network, IEEE, vol. 15, No. 2, pp. 2432, doi: 10.1109/65.912717.
Borg et al., "Efficient Multi-field Packet Classification for QoS Purposes", 1999 Seventh International Workshop on Quality of Service, pp. 1-10.

* cited by examiner

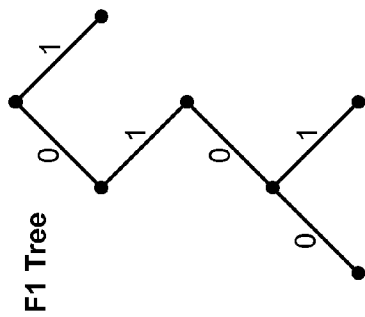
Fig. 4B
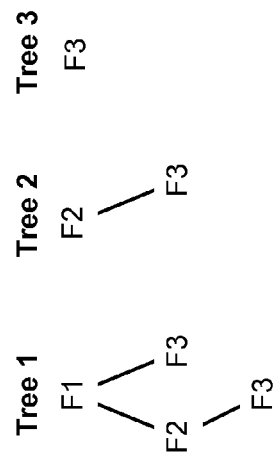
Fig. 4C
Fig. 4A

FAST UPDATE FILTER

RELATED APPLICATION

This application is a continuation of U.S. patent application Ser. No. 12/194,968 (now U.S. Pat. No. 8,352,391), filed Aug. 20, 2008, which is incorporated herein by reference.

BACKGROUND

A network firewall may provide a number of functions to help control the flow of information out of and/or into a secure network. Filters, such as firewall filters for network devices, may generally be program-based applications where an entire filter definition is taken into account and compiled to create a filter blob (or binary large object). In a dynamic filter context, a set of rules for the filter may frequently change as rule modifications, additions, and/or deletions occur. To incorporate changes in the filter definition, the filter blob is entirely replaced with a newly compiled filter blob.

SUMMARY

In one implementation, a method performed by a network device may include receiving a rule modification for a filter, where the filter includes an existing rule and a particular number of prioritized fields. The method may also include normalizing the rule modification to include a value for each of the prioritized fields, and performing a check for conflicts between the rule modification and the existing rule in the filter. The method may further include establishing backtracking links to integrate the rule modification with the existing rule, and adding the rule modification to the filter.

In another implementation, a method may include defining a filter for a network device, the filter including a rule and a particular number of prioritized fields, where at least one of the prioritized fields is formatted to accept input as a range of values. The method may also include receiving a rule modification for the filter, the rule modification including at least one input as a range of values, and performing a check for conflicts of the rule modification with the rule in the filter. The method may further include expanding the input range of values to form multiple rules equivalent to the rule modification with the input range of values, establishing backtracking links to integrate the multiple rules with the existing rule, and adding the multiple rules to the filter.

In a further implementation, a network device may include a memory to store a filter, where the filter includes a rule and a particular number of prioritized fields. The network device may also include a processor to receive a rule modification to a the filter, alter the rule modification to include a value in an empty one of the particular number of prioritized fields to ensure a match occurs, establish backtracking links to integrate the rule modification with the existing rule, and add the rule modification to the filter to provide an incremental change to the filter.

In yet another implementation, a computer-readable memory having computer-executable instructions may include one or more instructions to define a filter for a network device, the filter including a rule and a particular number of prioritized fields, one or more instructions to receive a rule modification for the filter, one or more instructions to normalize the rule modification to include a value for each of the prioritized fields in the filter, and one or more instructions to insert backtracking links into the filter.

In still another implementation, a system may include means for storing a filter for a network device, where the filter includes a rule and a particular number of prioritized fields. The system may also include means for receiving a rule modification for the filter, where the rule modification includes a field with a range value. The system may further include means for expanding the range value to form multiple rules equivalent to the rule modification, means for performing a check for conflicts of the multiple rules with the rule in the filter, and means for establishing backtracking links to integrate the multiple rules with the existing rule.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4A is an exemplary table for a filter that may be used with systems and/or methods described herein;

FIG. 4B is an exemplary radix tree structure for a field of the table of FIG. 4A;

FIG. 4C is an exemplary three dimensional data structure for particular fields of the table of FIG. 4A;

DETAILED DESCRIPTION

The following detailed description refers to the accompanying drawings. The same reference numbers in different drawings may identify the same or similar elements. Also, the following detailed description does not limit the invention.

Implementations described herein may include systems and/or methods that permit fast updates to a firewall filter. A filter update may include incremental changes in the firewall filter, such as addition of a rule, changes to an existing rule, deletion of a rule, etc. As used herein, the term "incremental changes," is to be broadly construed to include changes that may be accomplished without recompiling the entire filter. Fast update time can be an important consideration in firewall filters, and a filter structure that can make fast updates, without recompiling, may increase performance of network devices implementing such filter structures. Such filters may be referred to as "fast update filters."

Fast update filters may incorporate normalization of rule modifications and backtracking links to allow filter modifications without recompiling the entire filter. As used herein, "normalization" may refer to modifying a rule to include a value for every available field in the filter. As used herein, "backtracking" may refer to the process of going back to a node and/or a branch in a logical flow after previously bypassing the node and/or branch.

As further described herein, fast update filters may be based on a longest prefix match and/or priority ordering. A match condition may be defined as a single prefix match and/or range match. The filter may match one field at a time. Implementations described herein may permit a user to assign an absolute priority for each field to be used in a given filter at the time of filter creation. This absolute priority may not be changed for the lifetime of that filter.

Exemplary Network

Figure 1:
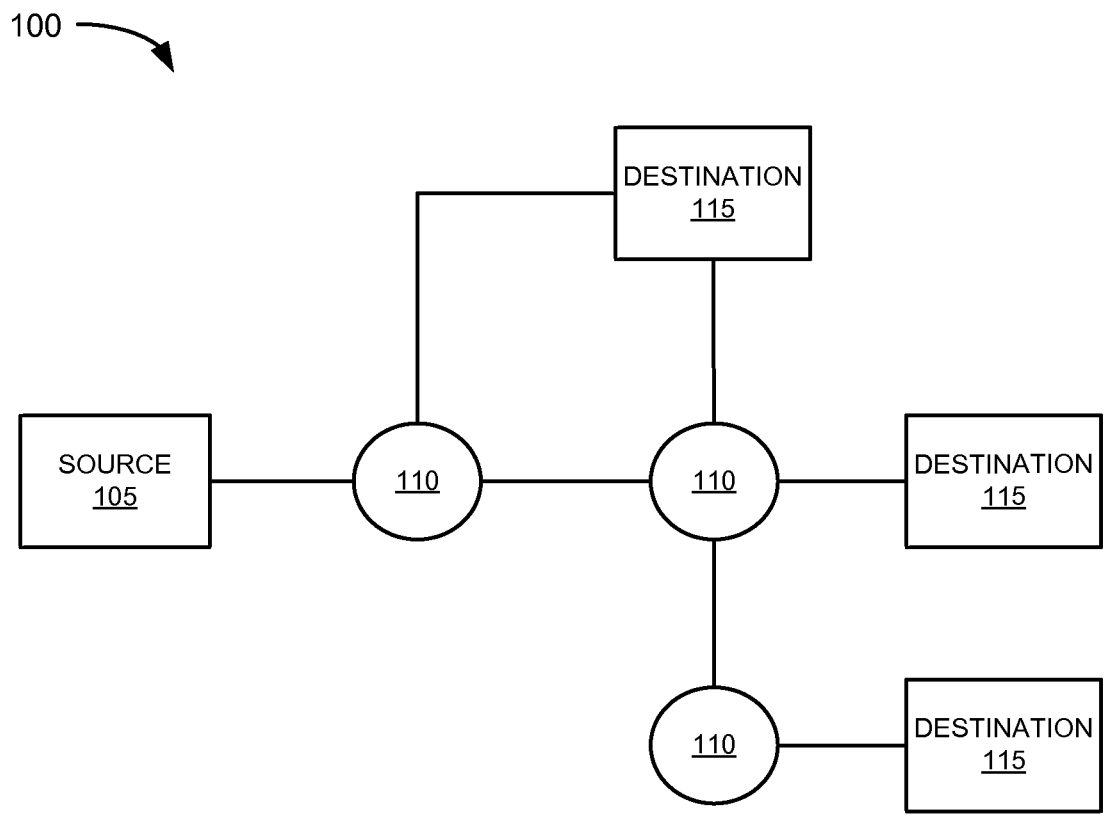
FIG. 1 is a diagram of an exemplary network in which concepts described herein may be implemented.

FIG. 1 is a diagram of an exemplary network 100 in which concepts described herein may be implemented. As illustrated, network 100 may include a source 105 connected to one or more network devices 110 (e.g., a router, a firewall, a server, a switch, etc.) for transmitting packets to one or more destinations 115. Source 105 may be a computing device (e.g., a server or personal computer) capable of transmitting information to one or more destination 115 (e.g, another computing device). Each network device 110 may include a plurality of multi-function multiports that are connected to various sources and destinations. A packet from source 105 may pass through more than one network device 110 prior to arriving at its destination 115. Source 105, network devices 110, and destinations 115 may be connected by wired and/or wireless connections.

Network device 110 may provide packet filtering by forwarding a subset of a received packet toward a destination 115. For example, network device 110 may include firewall functionality whereby incoming packets are examined for the presence of certain conditions, such as malicious code and/or unknown source addresses associated with a sender of the packet. Network device 110 may be configured so as to not forward packets containing these conditions. Firewall filters may be configured to, for example, filter packets (e.g., accept and/or discard packets), expose packets to quality-of-service (QoS) marking (e.g., group similar types of traffic together and treat each type of traffic as a class with its own level of service priority), and conduct traffic policing (e.g., control a maximum rate of traffic sent and/or received on an interface).

Exemplary Network Device

Figure 2:
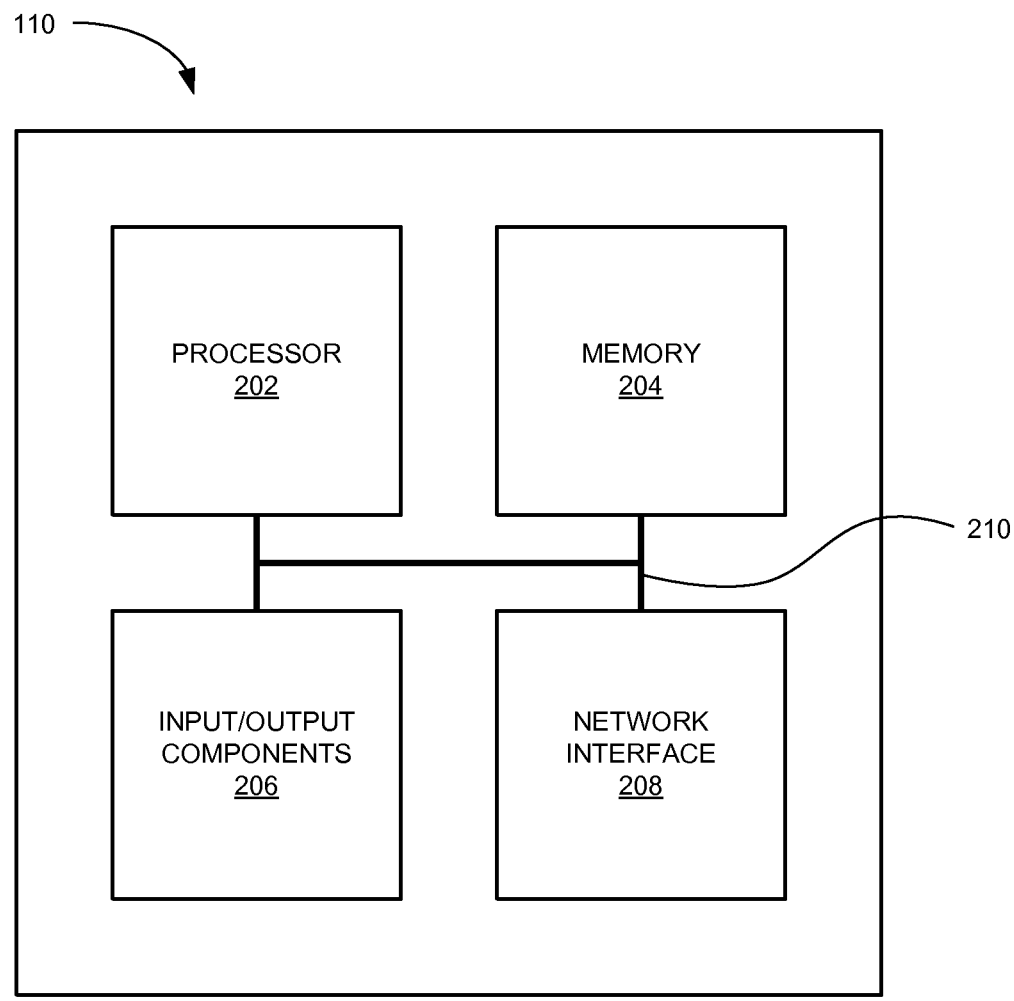
FIG. 2 is a block diagram of an exemplary network device of FIG. 1.

FIG. 2 illustrates an exemplary network device 110. As shown, network device 110 may include a processor 202, a memory 204, input/output components 206, a network interface 208, and a communication path 210. In different implementations, network device 110 may include additional, fewer, or different components than the ones illustrated in FIG. 2. For example, network device 110 may include additional network interfaces, such as line interfaces for receiving and forwarding packets.

Processor 202 may include a processor, a microprocessor, an Application Specific Integrated Circuit (ASIC), a Field Programmable Gate Array (FPGA), and/or other processing logic capable of controlling network device 110. Memory 204 may include static memory, such as read only memory (ROM), and/or dynamic memory, such as random access memory (RAM), or onboard cache, for storing data and machine-readable instructions. Memory 204 may also include storage devices, such as a floppy disk, a CD ROM, a CD read/write (R/W) disc, and/or a flash memory, as well as other types of storage devices.

Input/output components 206 may include a display screen, a keyboard, a button, a light-emitting diode (LED), a mouse, a speaker, a microphone, Universal Serial Bus (USB) lines, and/or other types of components for converting physical events or phenomena to and/or from digital signals that pertain to network device 110.

Network interface 208 may include any transceiver-like mechanism that enables network device 110 to communicate with other devices and/or systems. For example, network interface 208 may include mechanisms for communicating via a network, such as the Internet, a wireless network, a LAN, a MAN, a WAN, etc. Additionally or alternatively, network interface 208 may include a modem, an Ethernet interface to a LAN, a line card, and/or an interface/connection for connecting network device 110 to other devices.

Communication path 210 may provide an interface through which components of network device 110 can communicate with one another.

Although FIG. 2 shows exemplary components of a network device, in other implementations, network device 110 may contain fewer, different, or additional components than may depicted in FIG. 2. In still other implementations, one or more components of network device 110 may perform one or more other tasks performed by one or more other components of network device 110.

Figure 3:
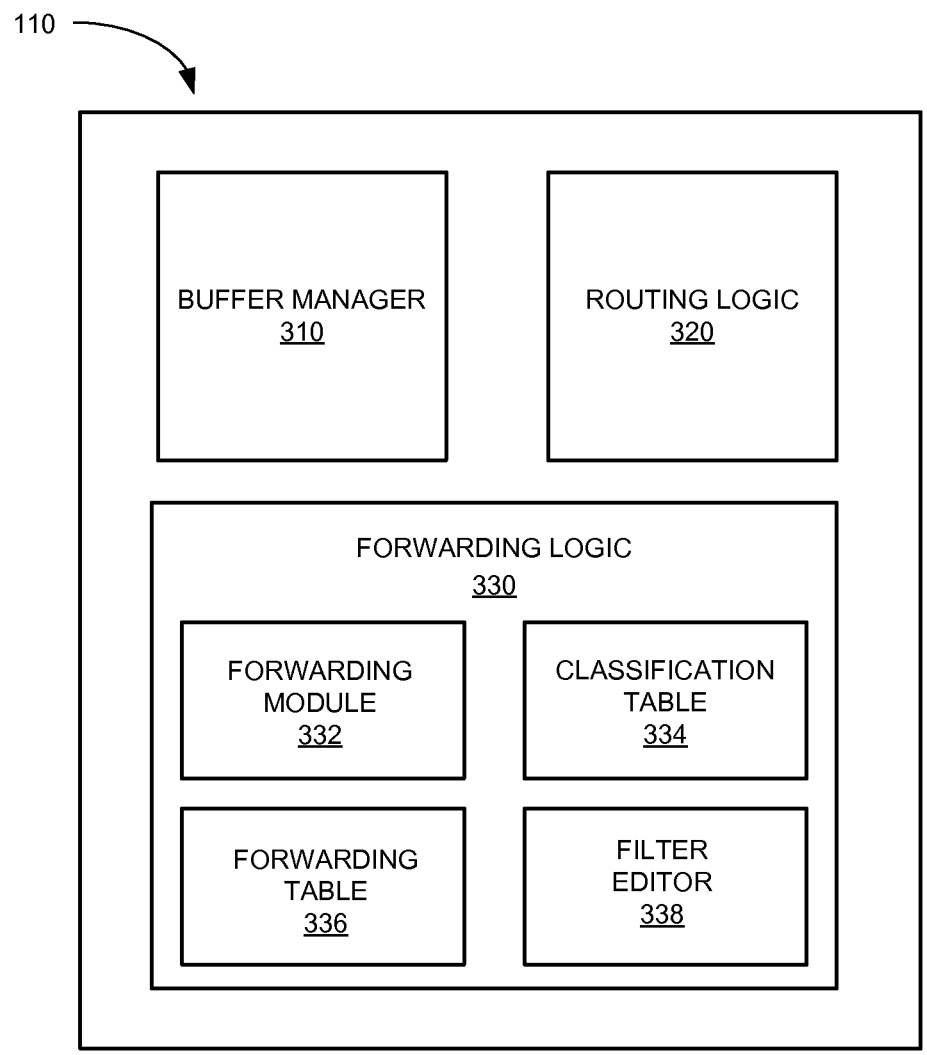
FIG. 3 is a functional block diagram of an exemplary network device of FIG. 1.

FIG. 3 is a functional block diagram of an exemplary implementation of network device 110. As illustrated, network device 110 may include a buffer manager 310, routing logic 320, and forwarding logic 330. Depending on specifics of the implementation, network device 110 may include additional, fewer, or different components than the ones illustrated in FIG. 3.

Buffer manager 310 may provide a buffer for queuing incoming packets. If packets arrive simultaneously, one or more of the packets may be stored in the buffer until higher priority packets are processed and/or transmitted. Routing logic 320 may include hardware, software, and/or a combination of hardware and software for communicating with routing logic of other devices to gather and store routing information in a routing information base (RIB).

Forwarding logic 330 may include hardware, software, and/or a combination of hardware and software for directing a packet to a proper output port on one of line interfaces (not shown) based on routing information. Forwarding logic 330 may be implemented on multiple components, such as network interfaces (e.g., line interfaces) in network device 110. In one implementation, forwarding logic 330 may include a forwarding module 332, a classification table 334, a forwarding table 336, and a filter editor 338. Depending on the implementation, forwarding logic 330 may include fewer, additional, or different components than those illustrated in FIG. 3.

Forwarding module 332 may include hardware, software, and/or hardware and software for forwarding and/or classifying a packet that is received at the line interface. When forwarding module 332 receives a packet, forwarding module 332 may perform a lookup of information related to the packet in classification table 334, process the packet based on the information, and forward the packet in accordance with information in forwarding table 336.

Classification table 334 may include rules for categorizing a packet based on a packet header. Examples of classification rules may include rules for performing a firewall rule lookup (e.g., access control list (ACL) lookup) for performing a policy based routing (e.g., if a packet header indicates that the packet is a telephony packet, route the packet from X to Y via an asynchronous transfer mode (ATM) circuit), and for rendering differentiated quality of service (QoS). Forwarding table 336 may include information for identifying an egress line interface to forward an incoming packet to a device based on the packet's network destination address.

Filter editor 338 may include hardware, software, and/or hardware and software for managing compilation and downloading of firewall filters. For example, filter editor 338 may receive additions, deletions, and/or changes to rules of the firewall filters. Based on the additions, deletions, and/or changes received, filter editor 338 may modify firewall configurations and may download updated classification tables 334 to support implementation of the updated filter.

Exemplary Filter Logic

FIG. 4A provides an exemplary table for a filter that may be used with systems and/or methods described herein. The table for the filter may be stored, for example, in memory 204 of network device 110 (FIG. 2). The filter may be based on a longest prefix match and/or priority ordering, as assigned by a user at the time of creation of the filter. The filter can match one field at a time. Referring to FIG. 4A, an exemplary filter may include K fields (F1, F2, F3, . . . , Fk) with the assigned priority decreasing sequentially from F1 to Fk (F1>F2>F3 . . . >Fk). Multiple rules (R1, R2, R3, . . . , Rj) may be added to the filter. A rule may be searched based on the assigned field priority, such that, for each rule, the filter may seek to match F1 first followed by F2, and so on, to Fk. The field priority may not be changed for the lifetime of the filter. In the table of FIG. 4A, fields F1, F2, and F3 of rules R1, R2, and R3 may include representative binomial values.

FIG. 4B shows a radix tree structure for the field F1 binomial values of rules R1 (0100*), R2 (0101*), and R3 (1*). The data structure for the resulting filter may be presented as a group of radix tree structures, where the tree structure for each field can be presented as a single node.

Assuming the table of FIG. 4A is limited to fields F1, F2, and F3 and rules R1, R2, and R3, FIG. 4C shows the three-dimensional data structure (in the form of Tree 1, Tree 2, and Tree 3) for all possible combinations of the fields F1, F2, and F3. In Tree 1, Tree 2, and Tree 3 of FIG. 4C, F1 represents the radix tree structure for the field F1 binomial values of rules R1 (0100*), R2 (0101*), and R3 (1*); F2 represents the radix tree structure for the field F2 binomial values of rules R1 (0110*), R2 (0101*), and R3 (*); and F3 represents the radix tree structure for the field F3 binomial values of rules R1 (001*), R2 (001*), and R3 (011*).

In implementations described herein, data structures (such as the three-dimensional data structure of FIG. 4C) may be merged into a single binomial-tree-like structure of radix trees to allow a network device (such as network device 110) to keep track of what is the next best match for a packet and to create backtracking links. Thus, if the best match route through the structure of radix trees does not lead to any action, the network device may use the backtracking links to search for the next best match.

To provide a structure to support the backtracking links, all available fields can be populated for each rule in the filter. Thus, a dummy (or wildcard) value may be added where a user may not otherwise include a value for a field in a particular rule. For example, referring back to FIG. 4A, the rule R3 may be expanded (or normalized) to include a value for the field F2, even though a user may not provide a value for that field when creating the rule R3.

Exemplary Process

Figure 5:
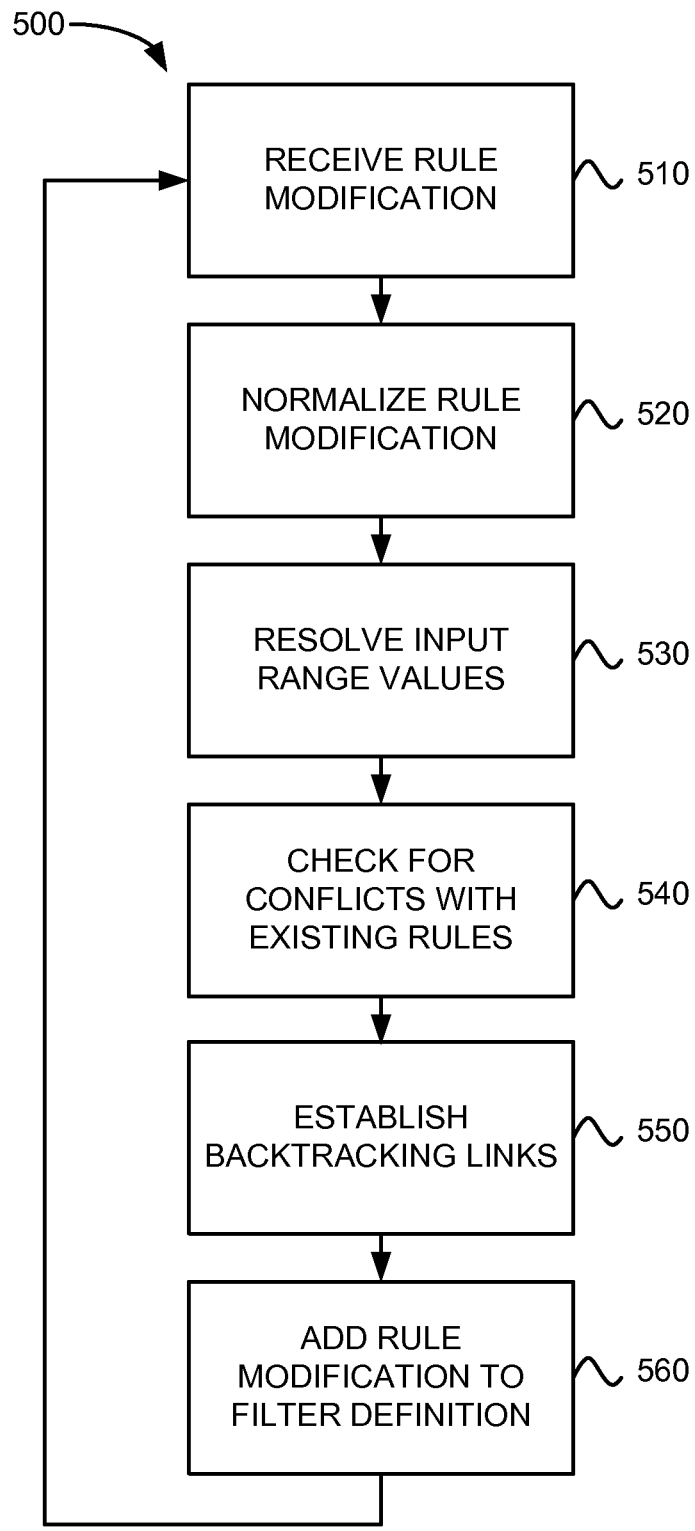
FIG. 5 is a flow diagram illustrating an exemplary process according to implementations described herein.

FIG. 5 is a flow diagram illustrating an exemplary process 500 according to implementations described herein. In one implementation, process 500 may be performed by network device 110. Process 500 may begin in response to a command to modify a filter definition of a firewall filter in network device 110. The filter may have a defined set of fields for incoming packets, such as, for example, an IP protocol field (IPP), a source address (SA) field, a destination address (DA) field, a source port (SP) field, and/or a destination port (DP) field. Each field may have a priority rank, selected, for example, by a user at the time the filter is created. For a given field, the filter may use the longest prefix rule to find the most specific match. Therefore, a more specific match can have a higher priority than a less specific match. Each rule may be associated with an action depending on the whether a match occurs in the filter. Some exemplary actions may include accepting a packet, discarding a packet, a policing action, and/or a counting action. Using the exemplary fields recited above (with priority rank from highest to lowest), an exemplary rule structure may be as follows:

IPP::SA::DA::SP::DP::Action.

Referring to FIG. 5, a rule modification may be received (block 510). For example, network device 110 may receive a command to add, delete, and/or modify a rule of an existing firewall filter. A rule may include specific entries for all or only some of the available fields in the filter (e.g., IPP, SA, DA, SP, DP and an action). Depending on the field structure, entries for each field may include, for example, a particular prefix match for a field or a range of values for that field. In one implementation, each field may be either a single prefix (with its prefix length) or a single range. In another implementation, multiple ranges may be used in a single field. Using the exemplary rule structure above, an exemplary new rule entry may be provided as:

TCP/8::10.1.0.1/32::*::2000-4000::1000::Action (police and count), where the IPP value (in prefix/prefix length format) may be "TCP/8," the SA value (prefix/prefix length) may be "10.1.0.1/32," the DA value may be "*" (indicating no value was provided), the SP value may be the range "2000-4000," the DP value may be the single range value "1000," and the Action value may be "police and count." A priority level may also be assigned for the new or modified rule. Priority levels may be, for example, categorical groupings (e.g., low, medium, high, etc.) and/or ordinal rankings.

The rule modification may be normalized (block 520). For example, if necessary, network device 110 may expand a user's added or modified rule to include a value for every available field in the filter. If a rule is provided with no value in one or more fields, network device 110 (using e.g., filter editor 338 of FIG. 3) may normalize that rule by substituting the missing fields with dummy values, such as prefix=0 prefix-length=0 for prefix fields and 0-MAX (where MAX may be the largest available value for the field size) for a range field, to ensure a match occurs at those fields. For example, the exemplary rule entry above with the omitted DA field ("*") may be normalized to:

TCP/8::10.1.0.1/32::0/0::2000-4000::1000::Action (police and count).

Input range values may be resolved (block 530). For example, if necessary, network device 110 may convert range values for particular fields into discreet prefix matches. If a range value is provided for a particular field, network device 110 may expand the range value to form multiple rules. More particularly, network device 110 may convert any range match to a set of prefix matches, which may cause the rule to explode into multiple rules. For example, the rule input provided above for the SP field range of 2000-4000 may be expanded into a minimum of eight prefixes:

[0] 2000/12 :000001111101
[1] 2016/11 :00000111111
[2] 2048/ 6 :000010
[3] 3072/ 7 :0000110
[4] 3584/ 8 :00001110
[5] 3840/ 9 :000011110
[6] 3968/11 :00001111100
[7] 4000/16 :0000111110100000

Thus, the exemplary rule entry above with the range 2000-4000 in the SP field may be normalized to:

[0] TCP/8::10.1.0.1/32::0/0::2000/12::1000/16::Action (police and count)
[1] TCP/8::10.1.0.1/32::0/0::2016/11::1000/16::Action (police and count)
[2] TCP/8::10.1.0.1/32::0/0::2048/ 6::1000/16::Action (police and count)
[3] TCP/8::10.1.0.1/32::0/0::3072/ 7::1000/16::Action (police and count)
[4] TCP/8::10.1.0.1/32::0/0::3584/ 8::1000/16::Action (police and count)
[5] TCP/8::10.1.0.1/32::0/0::3840/ 9::1000/16::Action (police and count)
[6] TCP/8::10.1.0.1/32::0/0::3968/11::1000/16::Action (police and count)
[7] TCP/8::10.1.0.1/32::0/0::4000/16::1000/16::Action (police and count)

Similar to the example above, multiple ranges within a single field may be converted to a set of prefix matches. Also, if multiple fields in a rule each have a range, the number of rules after expansion may multiply (e.g., if there are two ranges in a rule definition which expand to M and N prefixes, the rule may explode to M*N rules).

Still referring to FIG. 5, a check for conflicts with existing rules may be performed (block 540). For example, network device 110 may evaluate rules to identify logically contradictory input. Rules may be determined to conflict (or overlap) if there is a packet that could match more than one rule. In a dynamic filter context, a set of rules may change constantly as rule additions and/or deletions occur. Therefore, it may not be efficient to absolutely require that each rule addition or deletion not cause a conflict with the currently existing rule set. Rather, it may be sufficient to define a behavior in the event of a conflict and to inform a user of that behavior.

For example, where two rules conflict, there may be a variety of possible actions, depending on the overlap scenario. Where two rules have the exact same match, but request different actions, the priority value assigned to each rule can help in selecting which action may be performed in this case. If the priorities are the same, the rule modification for the filter may be rejected and an error message may be provided to a user.

As another example, two rules may have different matches with different actions, but the match ranges may overlap and one rule's match may be a proper subset of the other rule's match in terms of the ranges of the high priority fields. For fields that can be specified as a single value or a range, a single value may be considered more specific than a range and may, thus be given a higher priority.

As another example of conflicting rules, two rules may have different matches with different action, but the match ranges may overlap and one rule's match may not be a proper subset of the other rule's match in terms of the ranges of the high priority fields. Such a scenario may be limited only to instances were a particular field in each rule may be expressed in a range. If ranges are such that there is a non-zero overlap between the rules, then such rules may be deemed conflicting. Network device 110 may resolve one of the fields of the rules (for example, the rule being added to the existing filter definition) to eliminate the conflict (e.g., truncate the range to eliminate overlap) and may provide notification to a user.

Returning to FIG. 5, backtracking links may be established (block 550). For example, if necessary, network device 110 (using, e.g., filter editor 338) may establish a binomial-tree-like structure of radix trees to allow network device 110 to keep track of what is the next best match for a packet and to create backtracking links. Thus, if the best match does not lead to any action the network device may use the backtracking links to search the next best match. Backtracking link may be provided by setting a default route in any node tree (if not already occupied by a wildcard field) to point to the "next most specific" node which is in parallel with it. If no such "next most specific" node is present, the default route may point to a default action, such as, for example, a drop action.

The rule modification may be added to the filter definition (block 560). For example, filter editor 338 of network device 110 may forward a message to have forwarding logic 330 add the rule modification to, for example, classification table 334. For additional rule modifications, the process of flow diagram 500 may be repeated beginning at block 510.

EXAMPLE

Figure 6A:
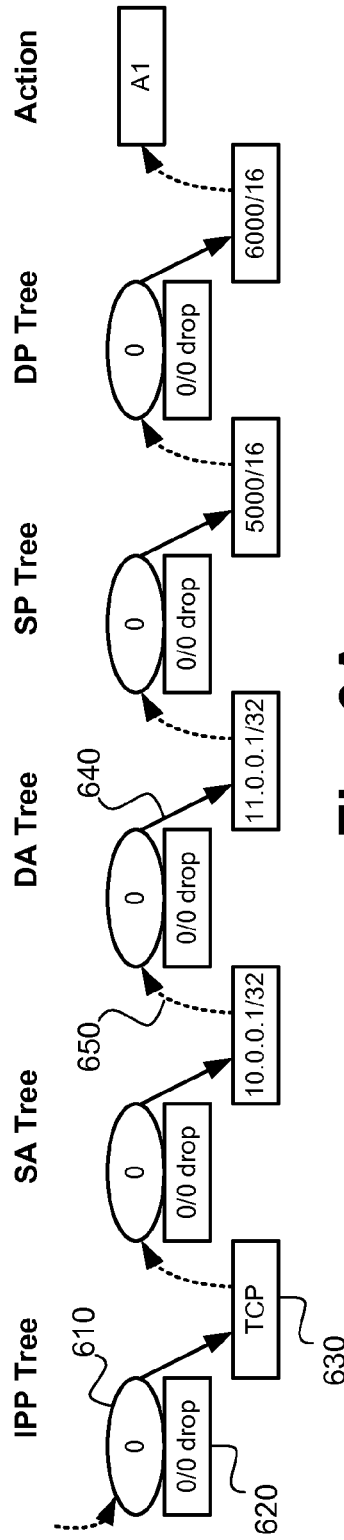
FIGS. 6A-6D illustrate an exemplary use of the systems and/or methods described herein as applied to the group of rules provided in Table 1 described herein.
Figure 6B:
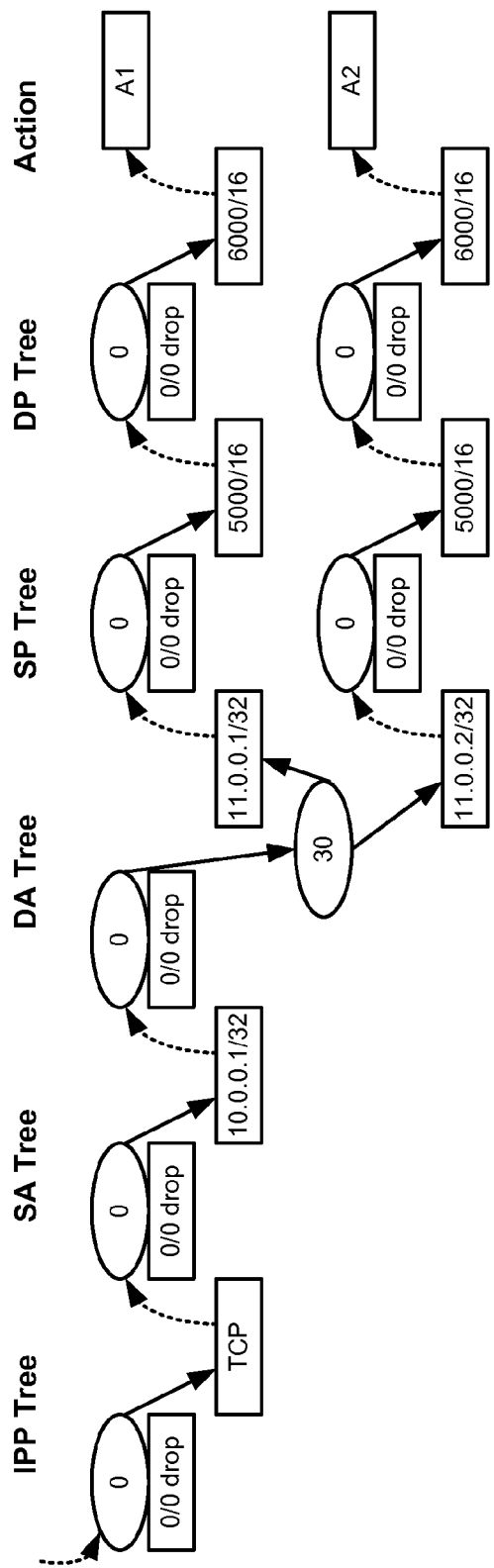
Figure 6C:
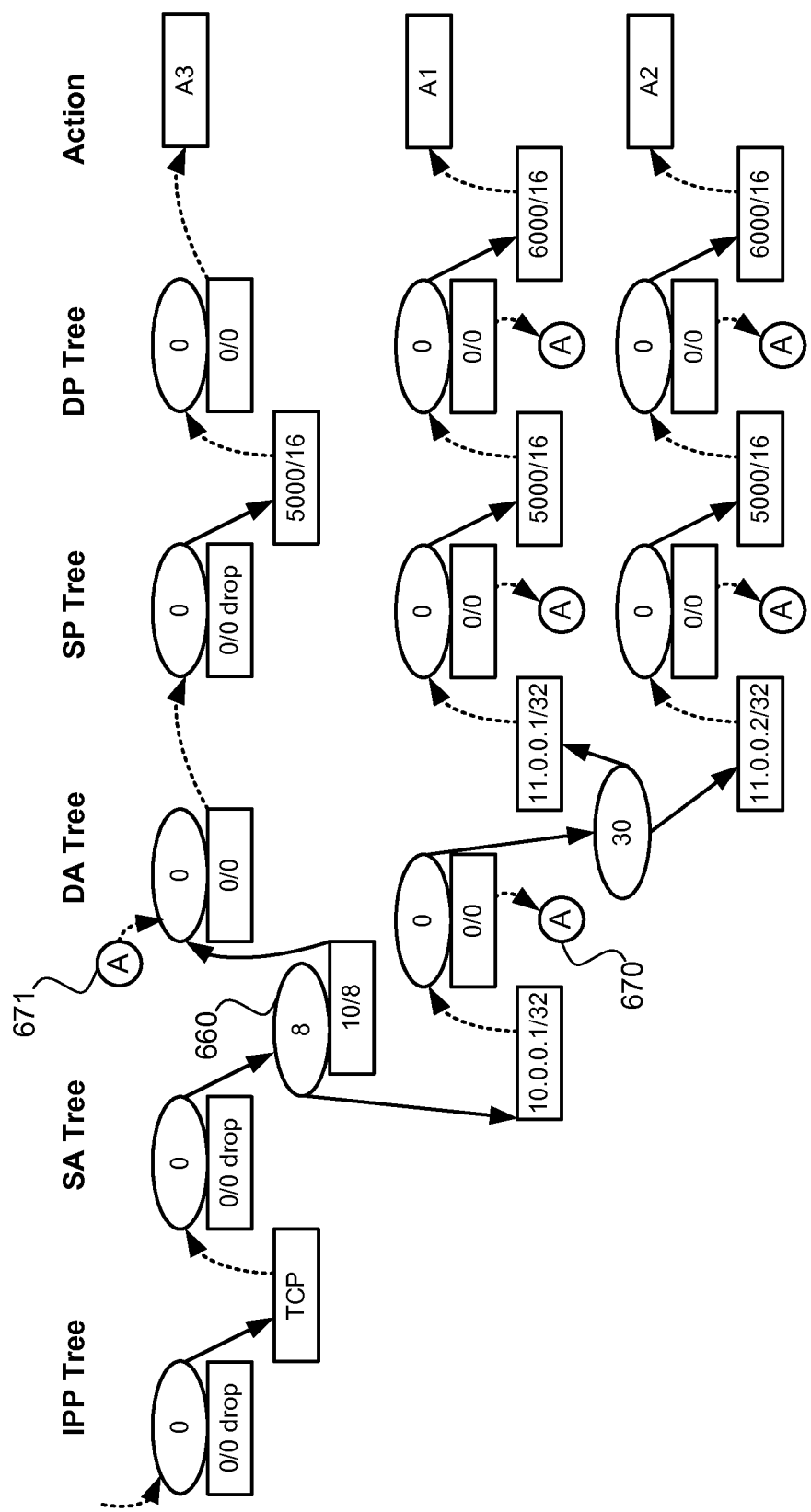
Figure 6D:
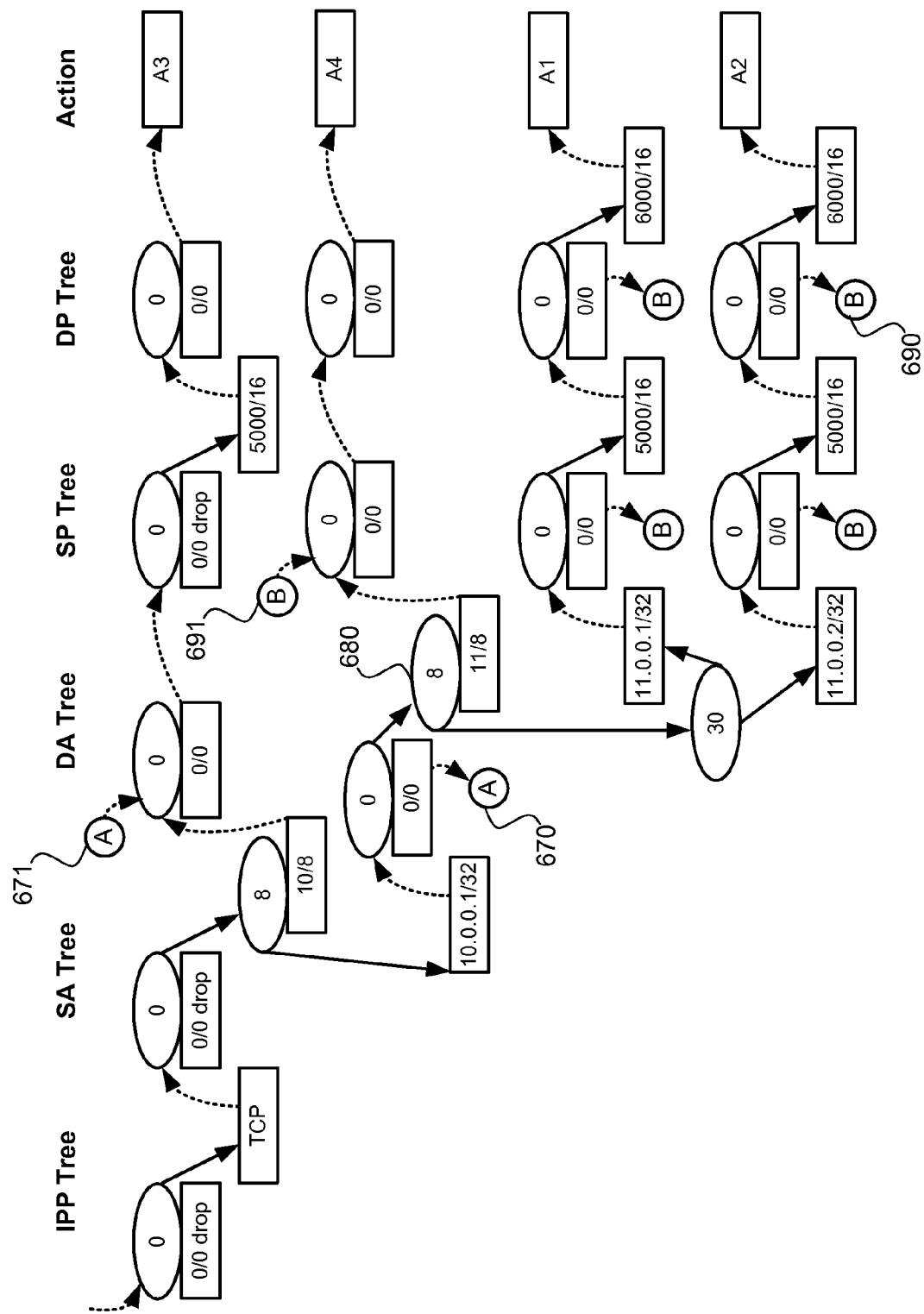

FIGS. 6A-6D illustrate an exemplary use of the systems and/or methods described herein. Each of FIGS. 6A-6D relates to one or more of the rules for an exemplary filter provided in Table 1 (below). The filter may include five fields: an IP protocol (IPP) field, a source address (SA) field, a destination address (DA) field, a source port (SP) field, and a destination port (DP) field, listed in order of descending priority. Each rule may include an action (Action) field to perform if a rule match occurs. FIG. 6A provides an exemplary node tree for rule 1 of Table 1. FIG. 6B provides an exemplary node tree for adding rule 2 to rule 1 of Table 1. FIG. 6C provides an exemplary node tree for adding rule 3 to rules 1 and 2 of Table 1. FIG. 6D provides an exemplary node tree for adding rule 4 to rules 1, 2, and 3 of Table 1.

TABLE 1

| RULE | IP Protocol | Source Address | Destination Address | Source Port | Destination Port | Action |
|---|---|---|---|---|---|---|
| 1 | TCP | 10.0.0.1/32 | 11.0.0.1/32 | 5000 | 6000 | A1 |
| 2 | TCP | 10.0.0.1/32 | 10.0.0.2/32 | 5000 | 6000 | A2 |
| 3 | TCP | 10/8 | * | 5000 | * | A3 |
| 4 | TCP | 10.0.0.1/32 | 11/8 | * | * | A4 |

As described above in connection with FIGS. 4A-4C, a node tree may be assembled to conduct matching of packets. Referring collectively to FIGS. 6A-6D, a radix tree structure for each field of Table 1 (e.g., the IP protocol (IPP), source address (SA), destination address (DA), source port (SP), and destination port (DP) fields) may be represented as a single node.

A filter definition may initially include a single rule, Rule 1 of Table 1. The filter process flow for Rule 1 is shown in FIG. 6A. Nodes for each field radix tree may be indicated with ovals, such as IPP tree node 610. A packet being matched against each field radix tree node may either have no match (as indicated by internal route indicator 620, showing the packet may be dropped) or may have a match (as indicated by leaf node 630, indicating a matching IP protocol was found). Generally, solid arrows, such as arrow 640 may represent a process flow for a successful lookup, while dotted arrows, such as arrow 650, may represent an internal nexthop (that is, the action to execute if there is a match). Other nodes and flow paths in FIG. 6A are not labeled with reference numbers for clarity. The process flow for Rule 1 carries forward to action A1 if all matches are successful.

When Rule 2 of Table 1 is added to the filter definition, the process flow may be represented by FIG. 6B. Because the IPP and SA fields of Rules 1 and 2 are identical, the process flow may remain the same as set forth in FIG. 6A until reaching the DA tree, and particularly to the distinction for the last digit of destination address (DA) prefix "11.0.0.2/32" of Rule 2. From that point, indicated as node "30" in FIG. 6B, a separate process flow for Rule 2 carries forward to action A2.

When Rule 3 of Table 1 is added to the filter definition, the process flow may be represented by FIG. 6C. Because the IPP field of Rules 1, 2, and 3 are identical, the process flow may remain the same as set forth in FIG. 6B until reaching the SA tree, and particularly to the distinction for subsequent digits beyond source address (SA) prefix "10/8" of Rule 3. From that point, indicated as node "8" (660) in FIG. 6C, a separate process flow for Rule 3 carries forward to action A3. The addition of the less-specific SA prefix "10/8" in Rule 3 presents a scenario where a packet may follow the more specific flow of Rules 1 and 2 to 10.0.0.1/32 and may need to "backtrack" to Rule 3 if a match is subsequently not found for the packet. A default route connector "A" (670) may be provided to the other node trees of Rules 1 and 2 (if not already occupied by a wildcard field) to point to the "next most specific" node from where the packet flow diverged. Thus, in FIG. 6C, a failure to match a packet in the flow paths of rules 1 or 2 may lead to backtracking to the Rule 3 flow at point 671.

When Rule 4 of Table 1 is added to the filter definition, the process flow may be represented by FIG. 6D. Because the IPP and SA fields of Rules 1, 2, and 4 are identical, the process flow may remain the same as set forth in FIG. 6C until reaching the DA tree, and particularly to the distinction for subsequent digits beyond destination address (DA) prefix "11/8" of Rule 4. From that point, indicated as node "8" (680) in FIG. 6D, a separate process flow for Rule 4 may carry forward to action A4. The addition of the less-specific DA prefix "11/8" in Rule 4 presents a scenario where a packet may follow the more specific flow of Rules 1 and 2 to 10.0.0.1/32 and may need to "backtrack" to Rule 4 if a match is subsequently not found for the packet. A default route connector "B" (690) may be provided to the other radix node trees of Rules 1 and 2 (if not already occupied by a wildcard field) to point to the "next most specific" node from where the packet flow diverged. Meanwhile, the default route connector "A" (670) may remain before the split at node "8" (680) to allow backtracking from that point. Thus, in FIG. 6D, a failure to match a packet in the flow paths of rules 1 and 2 after node 680 may lead to backtracking to the Rule 4 flow at point 691. Also, a failure to match a packet in the flow paths of rules 1, 2 and 4 before node 680 may lead to backtracking to the Rule 3 flow at point 671.

CONCLUSION

Implementations described herein may provide systems and/or methods that enable fast updates to a firewall filter by incorporating incremental changes to the filter. The fast update filter may incorporate normalization of rule modifications and backtracking links to allow filter modifications without recompiling the entire filter. The fast update filter may also permit matching for rules with terms expressed in a range, and may include conflict checking to limit logical inconsistencies within the rule modification.

The foregoing description of exemplary implementations provides illustration and description, but is not intended to be exhaustive or to limit the invention to the precise form disclosed. Modifications and variations are possible in light of the above teachings or may be acquired from practice of the invention.

For example, while a series of blocks has been described with respect to FIG. 5, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include firmware, hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 receiving, by a device, a rule modification for a filter,
  the filter including an existing rule and a plurality of fields;
 determining, by the device, that at least one of the plurality of fields includes a range of values;
 converting, by the device, the range of values to a plurality of different values to create a plurality of rules associated with the received rule modification,
  each of the plurality of rules including the plurality of fields,
  the plurality of fields each including a same value except for the at least one of the plurality of fields that includes the range of values,
  each of the at least one of the plurality of fields that includes the range of values including a respective, different value, and
  each of the different values being associated with a value in the range of values;
 establishing, by the device, one or more backtracking links to search for a best match in the plurality of rules; and
 adding, by the device and with out recompiling entirety of the filter, the plurality of rules to the filter.

2. The method of claim 1, further comprising:
 determining that a conflict exists between a rule, of the plurality of rules, and the existing rule in the filter; and
 resolving the conflict.

3. The method of claim 2, where, when determining that the conflict exists, the method includes:
 determining that a packet could be processed using the rule and using the existing rule.

4. The method of claim 2, where, when resolving the conflict, the method includes:

determining a first priority assigned to the rule;
determining a second priority assigned to the existing rule;
determining that the first priority and the second priority are the same; and
rejecting the rule modification.

5. The method of claim 1,
where the one or more backtracking links integrate the plurality of rules with the existing rule,
where the filter includes a plurality of trees, and
where, when establishing the one or more backtracking links, the method includes:
  setting a route in a first tree, of the plurality of trees, to point to one of:
    a next tree, of the plurality of trees, or
    a default action.

6. The method of claim 1, further comprising:
determining that the rule modification does not include a value for at least one of the plurality of fields; and
normalizing the rule modification to include a default value for the at least one of the plurality of fields.

7. The method of claim 6, where the default value is a dummy value.

8. A device comprising:
a memory; and
a processor, connected to the memory, to:
  receive a rule modification for a filter,
    the filter including an existing rule and a plurality of fields;
  determine that at least one of the plurality of fields includes a range of values;
  convert the range of values to a plurality of different values to create a plurality of rules associated with the received rule modification,
    each of the plurality of rules including the plurality of fields,
      the plurality of fields each including a same value except for the at least one of the plurality of fields that includes the range of values,
      each of the at least one of the plurality of fields that includes the range of values including a respective, different value, and
      each of the different values being associated with a value in the range of values;
  establish one or more backtracking links to search for a best match in the plurality of rules; and
  add the plurality of rules to the filter without recompiling entirety of the filter.

9. The device of claim 8, where the processor is further to:
determine that a conflict exists between a rule, of the plurality of rules, and the existing rule in the filter; and
resolve the conflict.

10. The device of claim 9, where, when determining that the conflict exists, the processor is to:
determine that a packet could be processed using the rule and using the existing rule.

11. The device of claim 9, where, when resolving the conflict, the processor is to:
determine a first priority assigned to the rule;
determine a second priority assigned to the existing rule;
determine that the first priority and the second priority are the same; and
reject the rule modification.

12. The device of claim 8,
where the one or more backtracking links integrate the plurality of rules with the existing rule,
where the filter includes a plurality of trees, and
where, when establishing the one or more backtracking links, the processor is to:
  set a route in a first tree, of the plurality of trees, to point to one of:
    a next tree, of the plurality of trees, or
    a default action.

13. The device of claim 8, where the processor is further to:
determine that the rule modification does not include a value for at least one of the plurality of fields; and
normalize the rule modification to include a default value for the at least one of the plurality of fields.

14. The device of claim 13, where the default value is a dummy value.

15. A non-transitory computer-readable medium containing instruction, the instructions comprising:
one or more instructions which, when executed by at least one processor, cause the at least one processor to:
  receive a rule modification for a filter,
    the filter including an existing rule and a plurality of fields;
  determine that at least one of the plurality of fields includes a range of values;
  convert the range of values to a plurality of different values to create a plurality of rules associated with the received rule modification,
    each of the plurality of rules including the plurality of fields,
      the plurality of fields each including a same value except for the at least one of the plurality of fields that includes the range of values,
      each of the at least one of the plurality of fields that includes the range of values including a respective, different value, and
      each of the different values being associated with a value in the range of values;
  establish one or more backtracking links to search for a best match in the plurality of rules; and
  add the plurality of rules to the filter without recompiling entirety of the filter.

16. The medium of claim 15, where the instructions further comprise:
one or more instructions to determine that a conflict exists between a rule, of the plurality of rules, and the existing rule in the filter; and
one or more instructions to resolve the conflict.

17. The medium of claim 16, where one or more instructions to determine that the conflict exists include:
one or more instructions to determine that a packet could be processed using the rule and using the existing rule.

18. The medium of claim 16, where one or more instructions to resolve the conflict include:
one or more instructions to determine a first priority assigned to the rule;
one or more instructions to determine a second priority assigned to the existing rule;
one or more instructions to determine that the first priority and the second priority are the same; and
one or more instructions to reject the rule modification.

19. The medium of claim 15,
where the one or more backtracking links integrate the plurality of rules with the existing rule,
where the filter includes a plurality of trees, and
where the one or more instructions to establish the one or more backtracking links include:

one or more instructions to set a route in a first tree, of the plurality of trees, to point to one of:
a next tree, of the plurality of trees, or
a default action.

20. The medium of claim 15, where the instructions further comprise:
one or more instructions to determine that the rule modification does not include a value for at least one of the plurality of fields; and
one or more instructions to normalize the rule modification to include a dummy value for the at least one of the plurality of fields.

* * * * *